3,007,853
PROCESS FOR PURIFYING ACRYLONITRILE
Germano Patron and Massimo Scatena, Milan, Italy, assignors to Sicedison S.p.A., Milan, Italy
Filed Dec. 10, 1958, Ser. No. 779,372
Claims priority, application Italy Dec. 24, 1957
7 Claims. (Cl. 202—57)

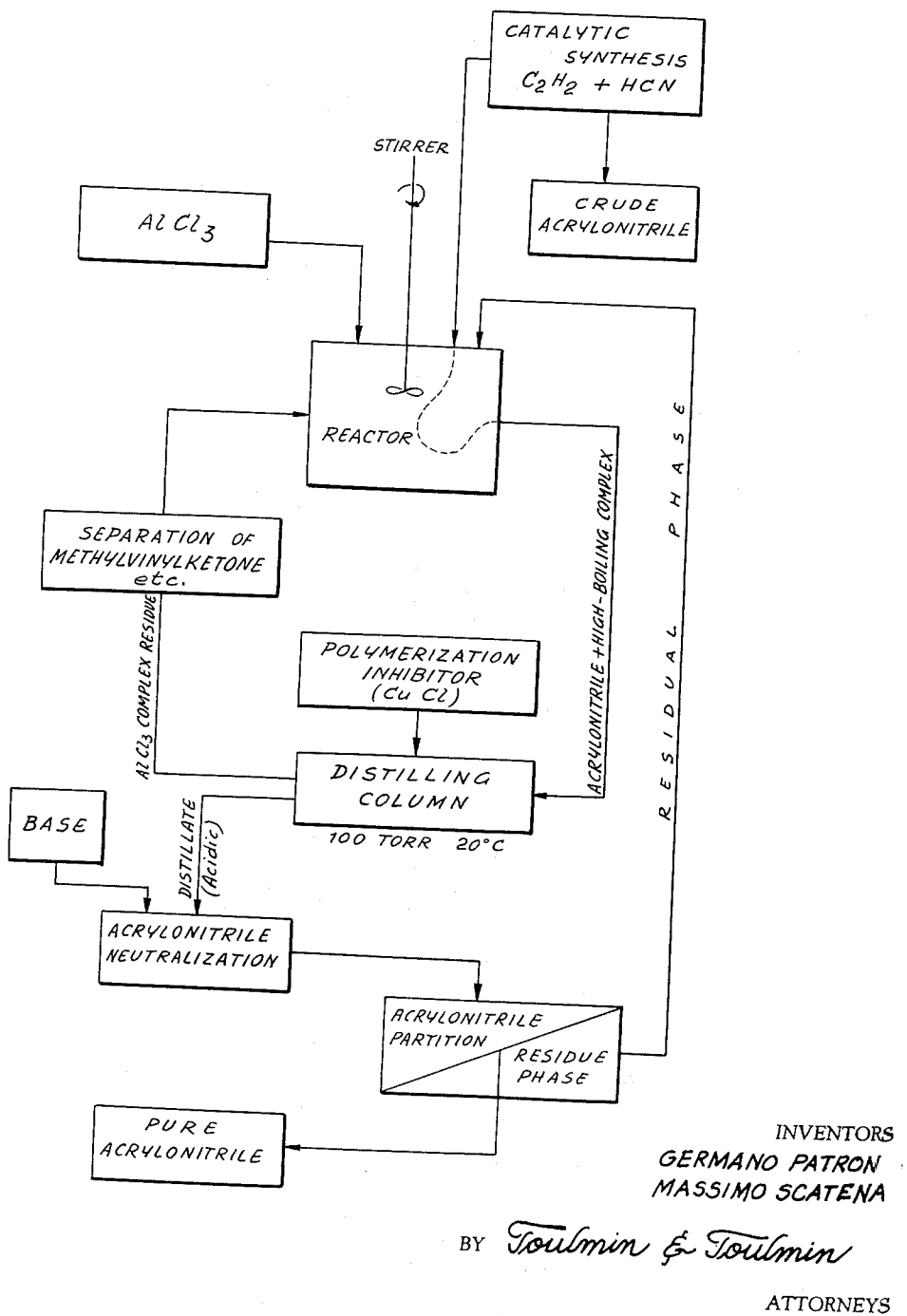

This invention relates to a new process for purifying acrylonitrile from usually associated impurities, particularly methylvinylketone.

It is known that acrylonitrile is produced by a synthesis from acetylene and hydrogen cyanide in the presence of a catalyst based on cuprous salts. The resulting crude reaction product is subsequently purified by proper absorption and distillation steps.

In this manner, a product is obtained which is commercially suitable for a variety of purposes. However, certain impurities always contained in the synthetically produced acrylonitrile make the latter unsuited for use in certain types of polymerizations. Particularly detrimental among these impurities are secondary reaction products of acetylene, such as monovinylacetylene and divinylacetylene, or condensation products between acetylene derivatives and hydrogen cyanide, such as, for instance, the 1-cyanobutane-2-4-diene, or products of the condensation between acetylene derivatives and water, such as methylvinylketone. A reaction mechanism leading to the formation of methylvinylketone is, for instance, represented by the following equation:

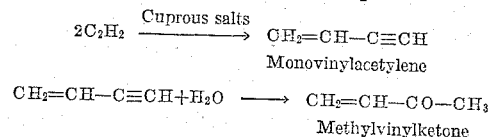

$$2C_2H_2 \xrightarrow{\text{Cuprous salts}} CH_2=CH-C\equiv CH$$
Monovinylacetylene $$CH_2=CH-C\equiv CH + H_2O \longrightarrow CH_2=CH-CO-CH_3$$
Methylvinylketone Methylvinylketone could also be formed during the synthesis of acrylonitrile by a reaction between acetylene and intermediarily formed acetaldehyde.

While the most of the above-mentioned products which result detrimental for the use of acrylonitrile in particular types of polymerization may be removed relatively easily by means of repeated distillations of acrylonitrile, the methylvinylketone cannot be eliminated practically in this manner, as the boiling points of methylvinylketone and acrylonitrile are very close to each other, namely at about 80.0° C. and 77.3° C., respectively.

The separation by distillation of this undesirable impurity would result excessively difficult and expensive. For it would be necessary to use very efficient fractionating columns with high reflux rates, since the degree of purity, which must be attained with respect to the methylvinylketone, is extremely high, i.e. less than 100 p.p.m. for every part of acrylonitrile; consequently there would arise the danger of a premature polymerization of still impure acrylonitrile.

It is, therefore, the object of our present invention to overcome the afore-described difficulties by providing a suitable process for the purification of acrylonitrile from the impurities usually accompanying the former.

It is more particularly the object of our invention to provide a process adapted for satisfactorily separating acrylonitrile from methylvinylketone.

It is finally an object of our invention to reduce the content of methylvinylketone in acrylonitrile to less than 100 p.p.m.

These objects are attained by the process of purifying acrylonitrile from methylvinylketone and similar impurities by adding to the crude reaction product of the synthetic production of acrylonitrile small amounts of anhydrous aluminum trichloride, whereby complexes of the latter with methylvinylketone are formed, which complexes are stable when heated and have a much higher boiling point than the acrylonitrile and ordinary methylvinylketone. It thus becomes possible to remove these complexes easily and completely by fractionated distillation in non-critical temperature ranges from the acrylonitrile to be purified.

The reaction may be carried out by dissolving in acrylonitrile a small amount of anhydrous aluminum chloride at room temperature, in proportion with the quantity of methylvinylketone present. As an order of magnitude, in practical operation, it is sufficient to add aluminum chloride in about a concentration of 0.01–5% by weight of the acrylonitrile. Formation of the complex should take place with the lowest possible water content, preferably not exceeding 0.5 part by weight of water for 100 parts of acrylonitrile (0.5%). While good results have been obtained with products containing water at 0.15% by weight, it is evident that in this case a greater amount of aluminum chloride is consumed, than if the water content is kept still lower. Moreover larger amounts of water would lead to the formation of considerable amounts of aluminum hydrate, the presence of which could be inconvenient. Excellent results were obtained when the water content in acrylonitrile was held between 0.03–0.08% by weight.

Since the reaction takes place almost instantaneously the contact time of the reactant with acrylonitrile need not be long and the distillation can then be carried out immediately following the treatment with anhydrous aluminum chloride. In order to avoid undesirable polymerizations during the distillation it is preferable to operate in the presence of stabilizers on a copper basis, such as cuprous chloride. The distilled product is acidic due to the presence therein of hydrochloric acid; this acidity is undersirable and must, therefore, be removed either by neutralization with an organic or inorganic base, or by using ion-exchange resins.

Suitable ion-exchange resins are, for instance, Amberlite type resins, manufactured by Rohm & Haas Co., Philadelphia, U.S.A.

In order to better understand the invention the following examples are given by way of illustration and are not to be intended to limit the invention.

*Example I*

0.4 g. anhydrous aluminum chloride are added to 200 g. acrylonitrile containing about 700 p.p.m. methylvinylketone and 0.02% water at room temperature. After aluminum chloride is completely dissolved, the mixture is distilled in the presence of about 20 p.p.m. cuprous chloride as inhibitor at a temperature of 77.3° C. at the top of the distillation column. The distilled product, which represents a yield of 97–98% of the starting mixture, was neutralized with aqueous NaOH (sodium hydroxide) solution at room temperature. The formed complex between aluminum chloride and methylvinylketone remains in the residue. The thus treated acrylonitrile is analyzed and the analysis shows that methylvinyl-ketone is present in a quantity lower than 15 p.p.m.

*Example Ia*

For the sake of comparison, the experiment described in Example I is repeated, with the difference that no aluminum chloride is added. Distillation leads to an acrylonitrile which still contains 700 p.p.m. of methylvinylketone.

*Example II*

0.4 g. anhydrous aluminum chloride are added to 200 g. acrylonitrile containing about 700 p.p.m. methylvinylketone and 0.02% water at room temperature. After the aluminum chloride is completely dissolved, the mixture is distilled at 77.3° C., at the top of the distillation column, in the presence of 20 p.p.m. cuprous chloride as inhibitor. The product which represents 97 to 98% of the starting mixture is neutralized with diethylamine. The analysis of the thus treated acrylonitrile shows an amount of less than 15 p.p.m. methylvinylketone.

*Example III*

0.4 g. anhydrous aluminum chloride are added to 200 g. acrylonitrile containing about 700 p.p.m. methylvinylketone and 0.02% water at room temperature. After the aluminum chloride was completely dissolved, the mixture is distilled at about 80° C. in the presence of cuprous chloride as inhibitor. The product which represents 97–98% of the starting mixture is passed over a bed of ion-exchange resin of anionic type, for instance, Amberlite manufactured by Rohm & Haas Co., Philadelphia, U.S.A.

Analysis of the purified acrylonitrile shows an amount of less than 15 p.p.m. methylvinylketone.

*Example IV*

To 3000 g. acrylonitrile containing about 700 p.p.m. methylvinylketone and 0.02% of water, are admixed 0.2% by weight of anhydrous aluminum chloride, and the resulting mixture is continuously introduced into a distillation apparatus which has previously been charged with 500 g. of acrylonitrile containing 700 p.p.m. methylvinylketone as well as 1 g. of anhydrous aluminum chloride as well as a small amount of cuprous chloride as inhibitor. The distillate collected during 10 consecutive hours is neutralized with diethylamine. Analysis of the thus treated acrylonitrile shows less than 15 p.p.m. methylvinylketone.

*Example V*

200 gr. per hour of acrylonitrile containing 0.07% water and 700 p.p.m. methylvinylketone, and 8 gr. per hour of a solution of 5% by weight of anhydrous aluminum chloride in acrylonitrile, are separately poured, by continuous addition, into a flask provided with a stirrer. The flask contains, at the start, 200 gr. of the aforesaid acrylonitrile and 8 gr. of the aforesaid anhydrous aluminum chloride-acrylonitrile solution.

The flask mixture is stirred, at room temperature, at about 150 r.p.m. and continuously transferred into a second flask at the rate of about 210 gr. per hour. From the latter flask the mixture is distilled at 77.3° C. and collected at a rate of about 200 gr. per hour. The second flask is charged with 20 p.p.m. of cuprous chloride as polymerisation inhibitor.

Operation of the apparatus for 40 hours yields a total of about 8000 grams of acrylonitrile. Samples taken every 2 hours are analyzed after neutralization, for instance, with NaOH, and reveal a methylvinylketone content which is each time below 15 p.p.m.

The process can also be carried out in a continuous manner as illustrated in the accompanying flow sheet. Crude acrylonitrile produced by catalytic synthesis and containing the described impurities is passed in a continuous flow through the reactor, provided with a stirrer, also acrylonitrile-anhydrous aluminum chloride solution is continuously added to said reactor. The methylvinylketone content in the acrylonitrile is converted to the high boiling complexes with $AlCl_3$ described above, which pass with the acrylonitrile into the distilling column. In this column distillation may be carried out at 77.3° C. and atmospheric pressure, or at a pressure of 200 Torr. (mm. of Hg) and about 40° C.

A polymerization inhibitor is present during the distillation. The distillate is then neutralized by adding basic substance, and pure acrylonitrile can be obtained by further distillation.

The residue from the distilling column containing the aluminum chloride complexes and small amounts of acrylonitrile can be reworked for acrylonitrile recovery. The said residue can first be separately distilled on a distillation column, and then be treated again in a reactor with anhydrous aluminum chloride as described above.

It will be understood that this invention is susceptible to further modification and, accordingly, it is desired to comprehend such modifications within this invention as may fall within the scope of the appended claims.

What is claimed is:

1. A process for the purification of crude acrylonitrile having impurities comprising methylvinyl ketone, as an impurity, said process comprising the steps of: mixing aluminum chloride with said crude acrylonitrile; reacting said aluminum chloride with said impurity to form high boiling compounds; and then distilling the acrylonitrile from said high boiling compounds.

2. The process described in claim 1 wherein the crude acrylonitrile contains up to 5% by weight of water.

3. The process described in claim 1 wherein the crude acrylonitrile contains from 0.03–0.08% by weight of water.

4. The process described in claim 1 wherein the distillation is accomplished in the presence of a stabilizer in order to prevent polymerization of the acrylonitrile.

5. The process described in claim 1 wherein the amount of aluminum chloride added to the crude acrylonitrile amounts to about 0.01% to about 5% by weight of the latter.

6. The process described in claim 1 wherein the crude acrylonitrile contains up to 5% by weight of water and the amounts of aluminum chloride added to the acrylonitrile amounts to 0.01% to about 5% by weight of the latter.

7. A process for the purification of crude acrylonitrile having methylvinyl ketone as an impurity, said process comprising the steps of: mixing aluminum chloride with said crude acrylonitrile; reaching said aluminum chloride with said impurity to form high boiling compounds; distilling the acrylonitrile from said high boiling compounds; adding sufficient alkaline reagent to said distilled acrylonitrile to neutralize any residual acidity; and then redistilling said acrylonitrile to obtain a pure anhydrous product.

References Cited in the file of this patent

UNITED STATES PATENTS

| | | |
|---|---|---|
| 2,000,881 | Coleman | May 7, 1935 |
| 2,126,277 | Pickett | Aug. 9, 1938 |
| 2,228,366 | Rumscheidt et al. | Jan. 14, 1941 |
| 2,296,218 | Middleton | Sept. 15, 1942 |
| 2,382,383 | Carpenter | Aug. 14, 1945 |
| 2,455,159 | Bremmer et al. | Nov. 30, 1948 |
| 2,656,376 | Martino | Oct. 20, 1953 |
| 2,739,930 | Borrel et al. | Mar. 27, 1956 |
| 2,770,644 | Owens | Nov. 13, 1956 |
| 2,784,216 | McDonald | Mar. 5, 1957 |
| 2,792,415 | Higgins | May 14, 1957 |